(12) United States Patent
Bowman et al.

(10) Patent No.: US 8,555,378 B2
(45) Date of Patent: Oct. 8, 2013

(54) AUTHORIZATION CACHING IN A MULTITHREADED OBJECT SERVER

(75) Inventors: Brian Payton Bowman, Apex, NC (US); John Forrest Boozer, Cary, NC (US)

(73) Assignee: SAS Institute Inc., Cary, NC (US)

( * ) Notice: Subject to any disclaimer, the term of this patent is extended or adjusted under 35 U.S.C. 154(b) by 654 days.

(21) Appl. No.: 12/538,561

(22) Filed: Aug. 10, 2009

(65) Prior Publication Data
US 2010/0235907 A1 Sep. 16, 2010

Related U.S. Application Data

(60) Provisional application No. 61/159,274, filed on Mar. 11, 2009.

(51) Int. Cl.
*G06F 7/04* (2006.01)
(52) U.S. Cl.
USPC .......................................................... 726/21
(58) Field of Classification Search
None
See application file for complete search history.

(56) References Cited

U.S. PATENT DOCUMENTS

| | | | |
|---|---|---|---|
| 5,261,102 A | 11/1993 | Hoffman | |
| 5,335,346 A | 8/1994 | Fabbio | |
| 5,742,759 A | 4/1998 | Nessett et al. | |
| 5,941,947 A | 8/1999 | Brown et al. | |
| 6,192,361 B1 | 2/2001 | Huang | |
| 6,286,005 B1 | 9/2001 | Cannon | |
| 6,292,798 B1 | 9/2001 | Dockter et al. | |
| 6,308,274 B1 | 10/2001 | Swift | |
| 6,374,292 B1 | 4/2002 | Srivastava et al. | |
| 6,470,079 B1 | 10/2002 | Benson | |
| 6,530,081 B1 | 3/2003 | Hayes, Jr. | |
| 6,928,398 B1 | 8/2005 | Fang et al. | |
| 6,941,472 B2 | 9/2005 | Moriconi et al. | |
| 6,976,090 B2 | 12/2005 | Ben-Shaul et al. | |
| 7,069,585 B1 | 6/2006 | Chess et al. | |
| 7,136,871 B2 | 11/2006 | Ozer et al. | |
| 7,171,411 B1 | 1/2007 | Lewis et al. | |
| 7,185,192 B1 | 2/2007 | Kahn | |
| 7,210,167 B2 | 4/2007 | Brezak et al. | |
| 7,254,547 B1 | 8/2007 | Beck et al. | |

(Continued)

FOREIGN PATENT DOCUMENTS

WO 0157706 8/2001

OTHER PUBLICATIONS

Bradlow, Eric T. et al., "Subscale Distance and Item Clustering Effects in Surveys: A New Metric", Journal of Marketing Research, vol. 38, No. 2, pp. 1-24, May 2001.

(Continued)

*Primary Examiner* — Cordelia Zecher
(74) *Attorney, Agent, or Firm* — Kilpatrick Townsend & Stockton LLP

(57) ABSTRACT

Systems and methods are included for accessing resource objects in a multi-threaded environment. A request is received from a requester to perform an operation with respect to a resource object, where the requested resource object has multiple associations with other objects. A determination as to whether an authorization cache entry corresponding to the requested resource object contains sufficient permission data for granting or denying the request for access to the requested resource object is made. A grant or deny of access to the requested resource object is returned when the authorization cache entry corresponding to the requested resource object contains sufficient permission data.

69 Claims, 16 Drawing Sheets

(56) References Cited

U.S. PATENT DOCUMENTS

| | | | |
|---|---|---|---|
| 7,370,344 | B2 | 5/2008 | Boozer et al. |
| 7,493,570 | B2 | 2/2009 | Bobbin et al. |
| 7,644,086 | B2 | 1/2010 | Boozer et al. |
| 2002/0099952 | A1 | 7/2002 | Lambert et al. |
| 2002/0129135 | A1 | 9/2002 | Delany et al. |
| 2002/0138572 | A1 | 9/2002 | Delany et al. |
| 2003/0110246 | A1 | 6/2003 | Byrne et al. |
| 2003/0174178 | A1 | 9/2003 | Hodges |
| 2003/0236979 | A1 | 12/2003 | Himmel et al. |
| 2004/0148409 | A1 | 7/2004 | Davis et al. |
| 2004/0205355 | A1* | 10/2004 | Boozer et al. ............ 713/200 |
| 2004/0230829 | A1 | 11/2004 | Dogan et al. |
| 2004/0254934 | A1 | 12/2004 | Ho et al. |
| 2005/0154885 | A1 | 7/2005 | Viscomi et al. |
| 2005/0204143 | A1 | 9/2005 | Ellington |
| 2006/0041582 | A1 | 2/2006 | Hekmatpour |
| 2006/0080316 | A1 | 4/2006 | Gilmore et al. |
| 2006/0137019 | A1 | 6/2006 | Dettinger et al. |
| 2006/0224590 | A1* | 10/2006 | Boozer et al. ............ 707/9 |
| 2007/0240106 | A1 | 10/2007 | Manson et al. |
| 2009/0222884 | A1 | 9/2009 | Shaji et al. |
| 2010/0325159 | A1 | 12/2010 | Wright et al. |
| 2012/0304307 | A1 | 11/2012 | Ramesh et al. |

OTHER PUBLICATIONS

Chen, Qimei et al., "Attitude toward the Site", Journal of Advertising Research, pp. 27-37, Sep.-Oct. 1999.

Cheung, Natasha, "Should organisations be tempted by the option of outsourcing their CRM applications?", Outward bound, Information Age, Jul. 13, 2001, http://www.information-age.com/article/2001/july/outward.sub.--bound (last visited Mar. 15, 2007) [5 pp.].

Chung, Chanjin et al., "Determinants of Temporal Variations in Generic Advertising Effectiveness", Agribusiness, vol. 16, No. 2, pp. 197-214, 2000.

Dawar, Niraj, "Extensions of Broad Brands: The Role of Retrieval in Evaluations of Fit", Journal of Consumer Psychology, 5(2), pp. 189-207, 1996.

Dholakia, Utpal M. et al., "What makes commercial Web pages popular?", European Journal of Marketing 32, 7/8, pp. 724-736, 1998.

Aaker, David A. et al., "On Using Response Latency to Measure Preference", Journal of Marketing Research, vol. XVII, pp. 237-244 (May 1980).

Bass, Frank M. et al., "Testing Distributed Lag Models of Advertising Effect", Journal of Marketing Research, vol. 9, pp. 298-309 (Aug. 1972).

Blair, Margaret Henderson, "An Empirical Investigation of Advertising Wearin and Wearout", Journal of Advertising Research, pp. 45-51 (Dec. 1987/Jan. 1988).

Cannon, Hugh M. et al., "Effective Reach and Frequency: Does It Really Make Sense?", Journal of Advertising Research, pp. 19-28 (Mar./Apr. 1994).

Clarke, Darral G., "Econometric Measurement of the Duration of Advertising Effect on Sales", Journal of Marketing Research, vol. XIII, pp. 345-357 (Nov. 1976).

Corkindale and Newall, "Advertising Thresholds and Wearout", European Journal of Marketing, vol. 12, No. 5, pp. 329-350 (1978).

Hu, Teh-Wei et al., "The State Antismoking Campaign and the Industry Response: The Effects of Advertising on Cigarette Consumption in California", The American Economic Review, vol. 85, No. 2, Papers and Proceedings of the Hundreth and Seventh Annual Meeting of the American Economic Association Washington, DC, Jan. 6-8, 1995, pp. 85-90 (May 1995).

Krishnamuthi, Lakshman et al., "Intervention Analysis of a Field Experiment to Assess the Buildup Effect of Advertising", Journal of Market Research, vol. XXIII, pp. 337-345 (Nov. 1986).

Lee, Jonq-Ying et al., "Lag Structures in Commodity Advertising Research", Agribusiness, vol. 8, No. 2, pp. 143-154 (1992).

Liu, Donald J. et al., "Generic Fluid Milk Advertising, Demand, Expansion, and Supply Response: The Case of New York City", Amer. J. Agr.Econ., pp. 229-236 (1988).

Pham, Michel Tuan et al., "Analyzing the Memory Impact of Advertising Fragments", Marketing Letters, 8:4, pp. 407-417 (1997).

Pritchett, James G. et al., "Optimal Choice of Generic Milk Advertising Expenditures by Media Outlet," Journal of Agricultural and Resource Economics, vol. 23, No. 1, pp. 155-169 (1998).

Simon, Julian L. et al., "The Shape of the Advertising Response Function", Journal of Advertising Research, vol. 20, No. 4, pp. 11-28 (Aug. 1980).

Tellis, Gerard J. et al., "Does TV Advertising Really Affect Sales? The Role of Measures, Models, and Data Aggregation", Journal of Advertising, vol. 24, No. 3, pp. 1-12 (Fall 1995).

Vakratsas, Demetrios et al., "How Advertising Works: What Do We Really Know?", Journal of Marketing, vol. 63, pp. 26-43 (Jan. 1999).

Venkateswaran, Meenakshi et al., "Modeling Advertising Carryover in Fluid Milk: Comparison of Alternative Lag Specifications", Agricultural and Resource Economics Review, vol. 22, No. 1, pp. 10-19 (Apr. 1993).

Wilkins, Nick et al., "Economic Analysis of Tobacco Demand", World Bank Economics of Tobacco Toolkit, Tool 3. Demand Analysis, (2001) [105 pp.].

Non-Final Office Action of May 10, 2013 for U.S. Appl. No. 13/439,536, 16 pages.

* cited by examiner

| Assoc ObjRef | ObjTyp1 | ObjTyp2 | ObjRef1 | ObjRef2 | AssocRole |
|---|---|---|---|---|---|
| ASSOC_0041 | ProtObj$_1$ | ACE$_1$ | TABLE_0010 | ACE_0005 | ACCESSCONTROLS |
| ASSOC_0487 | ProtObj$_1$ | ACE$_2$ | TABLE_0010 | ACE_0009 | ACCESSCONTROLS |
| ASSOC_0004 | ProtObj$_1$ | ACE$_3$ | TABLE_0010 | ACE_0014 | ACCESSCONTROLS |
| ASSOC_0021 | ACE$_1$ | PERMISSION$_1$ | ACE_0005 | PERM_0004 | PERMISSIONS |
| ASSOC_0003 | ACE$_1$ | PERMISSION$_2$ | ACE_0005 | PERM_0009 | PERMISSIONS |
| ASSOC_0007 | ACE$_1$ | PERMISSION$_3$ | ACE_0005 | PERM_0002 | PERMISSIONS |
| ASSOC_0104 | ACE$_1$ | PERSON$_1$ | ACE_0005 | PERSON_0012 | IDENTITIES |
| ASSOC_0099 | ACE$_1$ | GROUP$_1$ | ACE_0005 | GROUP_0003 | IDENTITIES |
| ASSOC_0011 | ACE$_2$ | PERMISSION$_1$ | ACE_0009 | PERM_0004 | PERMISSIONS |
| ASSOC_0094 | ACE$_2$ | GROUP$_1$ | ACE_0009 | GROUP_0004 | IDENTITIES |
| ASSOC_0014 | ACE$_3$ | PERMISSION$_1$ | ACE_0014 | PERM_0001 | PERMISSIONS |
| ASSOC_0024 | ACE$_3$ | PERMISSION$_2$ | ACE_0014 | PERM_0003 | PERMISSIONS |
| ASSOC_0002 | ACE$_3$ | PERSON$_1$ | ACE_0014 | PERSON_0033 | IDENTITIES |

Fig. 4

AUTHORIZATION CACHING IN A MULTITHREADED OBJECT SERVER

This application claims priority to U.S. Provisional Application No. 61/159,274, filed on Mar. 11, 2009, entitled, "Authorization Caching in a Multithreaded Object Server," the entirety of which is herein incorporated by reference. This disclosure is related to U.S. Pat. No. 7,370,344 to Boozer entitled, "Computer-Implemented Data Access Security System and Method" and to U.S. patent application Ser. No. 11/092,138 by Boozer entitled, "Computer-Implemented Authorization Systems and Methods Using Associations," the entirety of both of which is herein incorporated by reference.

FIELD

The technology described in this patent document relates generally to computer resource management and specifically to resource authorization management.

BACKGROUND

Many computer systems have to cope with a diverse set of users requesting access to resources stored within systems. An example of users requesting access involves requests to access a directory-based file system. In this situation, access may be determined by defining access boundaries through analysis of a straightforward hierarchical convention involving the resource.

As an illustration, FIG. 1 depicts a directory-based file system having a straightforward hierarchical convention 500 wherein its items have one parent. The top-level directory "C:\" 502 occupies the top position in the directory hierarchy and is a hierarchical parent of the subdirectories "MYDIR" and "PUBLIC" (504 and 506). Subdirectory MYDIR 504 is itself a parent of the "TEST1.XLS" file 508. Subdirectory PUBLIC 506 is a parent of the "TEST2.XLS" file 510 and "TEST3.XLS" file 512. This type of directory hierarchical structure allows for relatively straightforward security access due in part to the single parent nature of the items in the hierarchy. However, security access issues substantially increase in difficulty when a computer system involves more complex items and relationships.

A multithreaded object server may support multiple, concurrent users that make requests for various defined object types. For example, an object may be a meta-data object stored in a meta-data repository. In a large-scale production server, the sheer number of objects, coupled with the volume of requests can be enormous. This can impact scalability, especially when factoring in the authorization overhead for each requested object.

SUMMARY

In accordance with the teachings provided herein, systems and methods are provided for accessing resource objects in a multi-threaded environment. A request may be received from a requester to perform an operation with respect to a resource object, where the requested resource object has multiple associations with other objects. An authorization cache may be searched for an authorization cache entry corresponding to the requested resource object, and an authorization cache entry corresponding to the requested resource object may be built when no authorization cache entry corresponding to the requested resource object is located by the searching. A determination as to whether the authorization cache entry corresponding to the requested resource object contains sufficient permission data for granting or denying the request for access to the requested resource object may be made, and a grant or deny of access to the requested resource object may be returned when the authorization cache entry corresponding to the requested resource object contains sufficient permission data.

As an additional example, a processor-implemented system for accessing resource objects in a multi-threaded environment may include a receiver configured to receive a request to perform an operation with respect to a resource object where the requested resource object has multiple associations with other objects, and the multiple associations with other objects include multiple direct parent associations. A search engine may be configured to search an authorization cache for an authorization cache entry corresponding to the requested resource object, and a cache entry builder may be configured to build an authorization cache entry corresponding to the requested resource object when no authorization cache entry corresponding to the requested resource object is located by the search engine. A permission entry evaluator may be configured to determine whether the authorization cache entry corresponding to the requested resource object contains sufficient permission data for granting or denying the request for access to the requested object, where a grant or deny of access to the requested resource object is returned when the authorization cache entry corresponding to the requested resource object contains sufficient permission data. A grant or deny of access to the requested resource object may be determined by the permission entry evaluator using inherited permission data from the multiple other objects associated with the requested resource object when the authorization cache entry corresponding to the requested resource object contains insufficient permission data.

As a further example, a method of synchronizing modifications to a cache of permissions controlling access to a network of objects in a multi-threaded environment, where an object has multiple associations with other objects, where the multiple associations with other objects include multiple direct parent associations may include monitoring thread processing to detect the addition or deletion of a relationship between a child object and a parent object. The monitoring may include queuing the parent object in a thread specific inheritance change queue upon detection of an addition or deletion of a relationship between a child object and a parent object and adding the child object to the queued parent object record in the thread specific inheritance change queue. The method may further include monitoring thread processing to detect the modification of an access control object. This monitoring may include queuing the modification of an access control object in a thread specific association change queue. The method may further include monitoring thread processing to detect the deletion of a deleted object that includes queuing the deleted object in a thread specific delete queue. The method may also include executing changes detailed in records of the thread specific inheritance change queue, the thread specific association change queue, and the thread specific delete queue upon a thread commit operation under protection of an exclusive cache lock.

BRIEF DESCRIPTION OF THE DRAWINGS

FIG. 4 is a table depicting association entries for the objects shown in FIG. 2.

DETAILED DESCRIPTION

Figure 1:
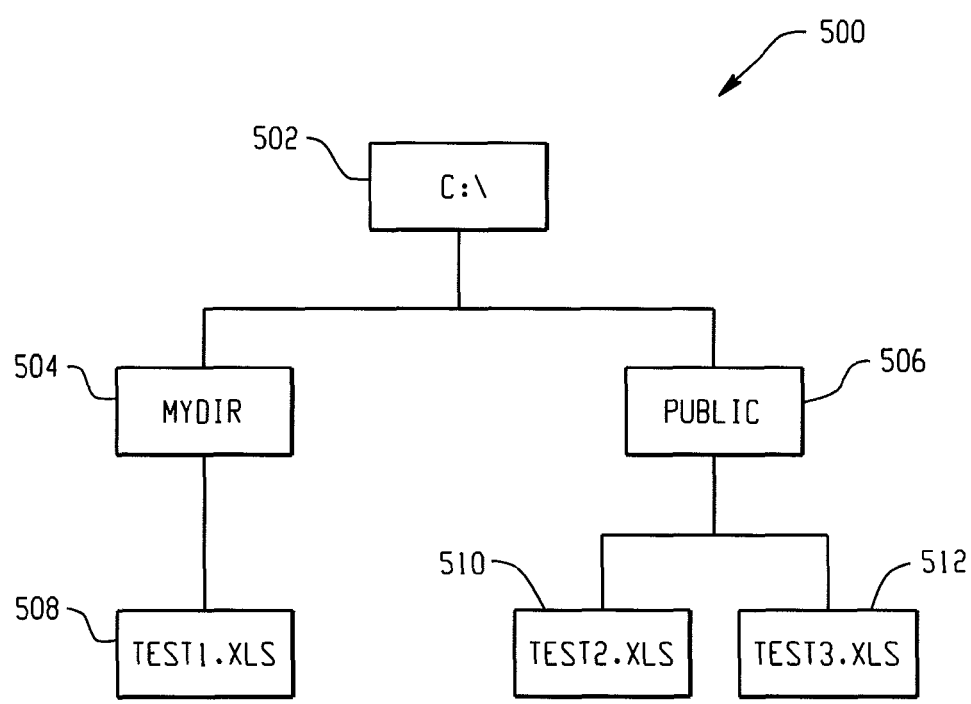
FIG. 1 depicts a hierarchical convention used with directory-based file systems.
Figure 2:
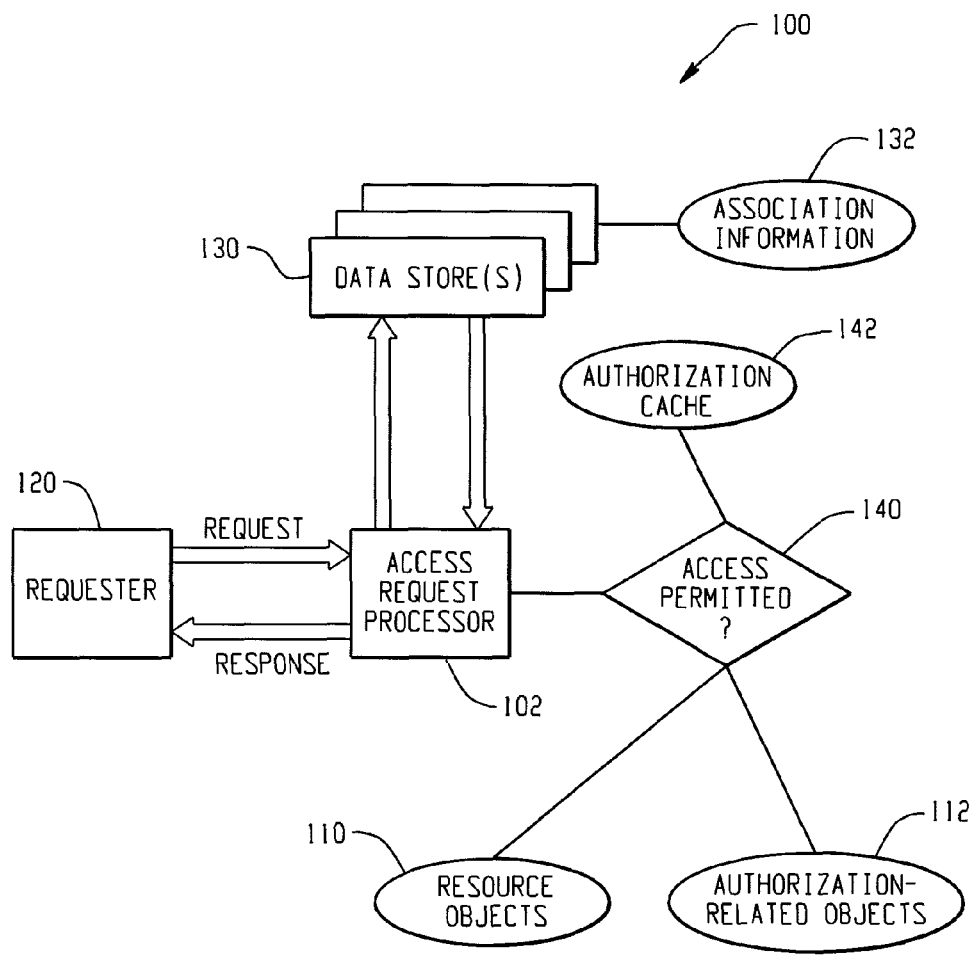
FIG. 2 depicts a block diagram of computer and software components utilized in a data access security system.

FIG. 2 depicts at 100 an access authorization system wherein an access request processor 102 determines whether a request to access a resource object 110 should be granted. The access request processor 102 receives a request from a requester 120 to access a resource object 110. The requester 120 can be a human or a computer program that is requesting the access to a resource object 110.

As part of its processing, the access request processor 102 accesses one or more data stores 130. The data stores 130 contain information 132 about which resource objects 110 are associated with which authorization-related objects 112. This association information is used to join the other non-authorization related objects in a myriad of ways, creating a network of paths between objects. FIGS. 1-8 of U.S. Pat. No. 7,370,344, incorporated by reference above, illustrate the use of associations in conjunction with inheritance rules indicated in FIG. 9 herein. Association information 132 is used by the access request processor 102 to determine whether authorization should be granted to the requester 120. The system may further include an authorization cache 142 for storing access control information based on previously accessed authorization-related objects for fast retrieval.

Figure 3:
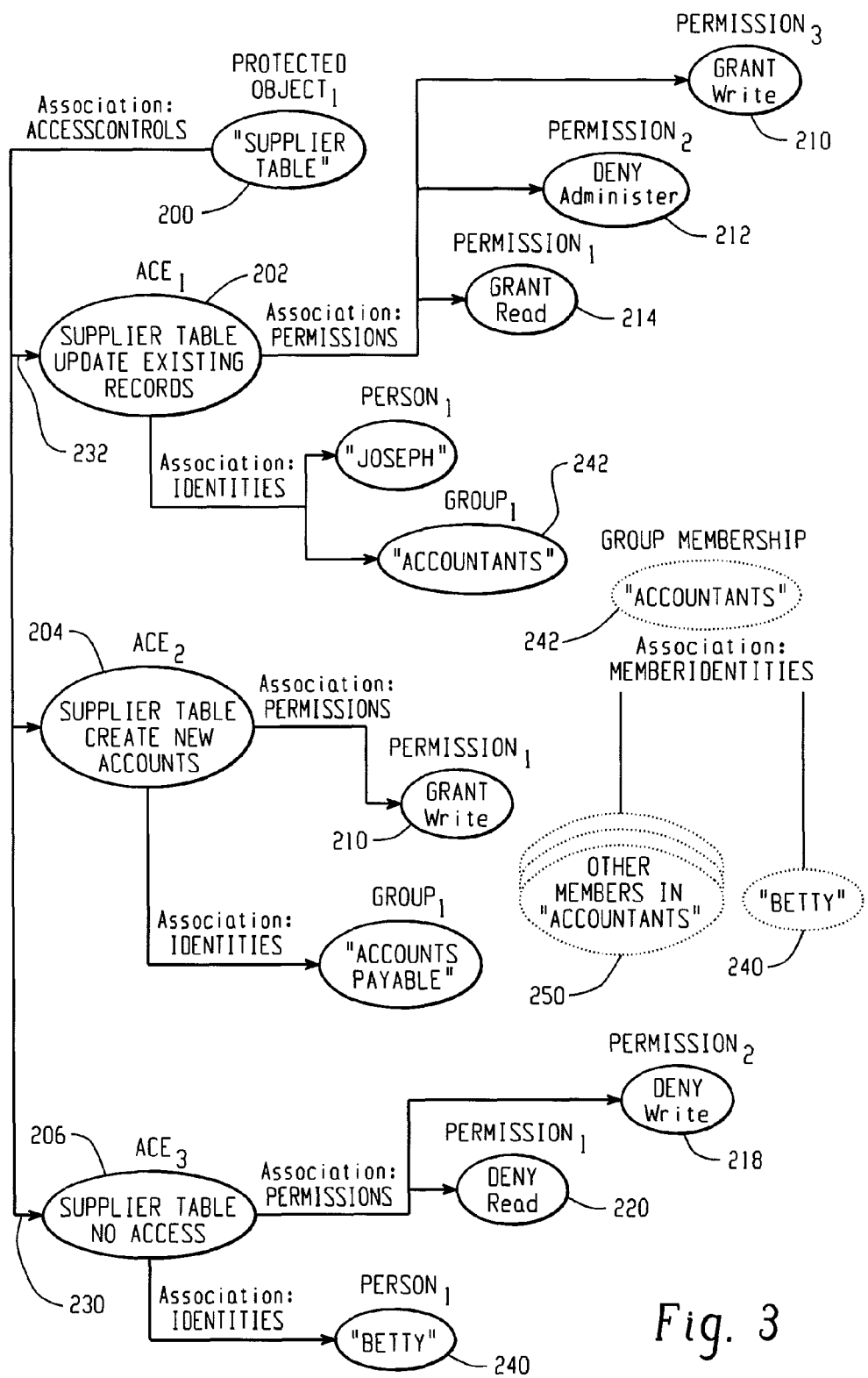
FIG. 3 is an object model diagram illustrating a protected object with multiple associated authorization-related objects.

FIG. 3 depicts a resource object 200 that is protected by multiple associated authorization-related objects (e.g., access control entry objects 202, 204, 206 and permission objects 210, 212, 214, 218, 220). An oval-shaped shape represents an object (e.g., protected resource object 200) and the line connecting it to another object represents their association (e.g., association 230 that connects protected object 200 with access control entry object 206). An association identifies the relationship between two objects that may be represented by an object.

The model shown in FIG. 3 can apply to various classes of objects (e.g. "Table", "Column", "ServerConnection", etc.). Each object class represents a type that has a set of attributes and associations. A container includes a persisted collection of objects of the same type. Each container can be stored as a relational table with columns representing object attributes and rows containing actual object data. A container can be queried when objects of its type are requested.

An association object describes the linkage between two objects. The association container can be queried for association objects, and intermediate query results can be aggregated for final authorization determination. An object which can be involved in an association is an Access Control Entry (ACE) object. An Access Control Entry (e.g., ACE 202) is related by association objects to the following: the object that it protects; one or more permission objects; and one or more identity objects.

A system can be configured to use association containers by recognizing that information to determine authorization is contained in associations between authorization-related objects. Association objects can reside in their own association container that is queried during the authorization determination process. With this configuration, a system does not have to query or instantiate actual permission objects (e.g., objects 210, 212, 214, 218, 220) or identity objects (e.g., objects 240, 242).

The objects shown in FIG. 3 illustrate how several association container queries can be used to correlate and transform the access controls that protect an object. An object (e.g., protected object 200) is "protected" by one or more sets of associated authorization-related objects (e.g., objects 202, 204, 206). In general, authorization-related objects may include, but are not limited to, access control, permission, identity, permission condition, and/or association objects.

The model shown in FIG. 3 may be extended to include memberships. Persons and groups may be placed in a group membership, such as the Betty person object 240 and other member objects 250 can be placed in an accountants group membership object 242.

FIG. 4 shows the association container entries for the objects shown in FIG. 3. In the table of FIG. 4, ObjTyp1 and ObjTyp2 values correspond to the objects described in FIG. 3. For example, the association object reference ASSOC__0041 in row 300 of the table in FIG. 4 corresponds to association 232 on FIG. 3 which associates protected object 200 with ACE 202. For each row in the table of FIG. 4, the related ObjRef1 and ObjRef2 values are the actual object references.

A set of authorization inheritance rules is used to traverse associations that comprise an network of "inheritance parent" objects whereby an access control decision for an object may be determined indirectly "by inheritance" for an object. It should be noted that this inheritance mechanism is not limited to a hierarchy. It may also be a true network where multiple parents at multiple levels are possible.

Inheritance is the means by which authorization is determined for objects that do not have directly applied authorizations or where such authorizations do not match the requesting identity/required permission. With the inheritance mechanism, authorization-related objects normally are applied to a relatively small number of the total number of objects in a server. Inheritance uses associations to traverse a network of parent objects, which determine the access control decision.

A server defines a large set of generalized object types as well as more specialized authorization-related object types that maintain access control definitions for generalized objects. In addition there is a special association object type used to define various role and cardinality relationships between objects. Associations are used to join the authorization objects that provide access control on other objects. Associations exist between access control objects and the objects they protect. Techniques of optimization are described where the set of authorization objects are queried and transformed into an in-memory cache at the initial access control decision request for an object. Thereafter, decisions for this object can be satisfied from the in-memory cache. As an example, an authorization caching scheme maintains in-memory references between cache entries that are related according to associations described by the inheritance model. Because a large percentage of access control decisions are determined by inheritance, the cache may eliminate the need for repeated association queries to determine the same inheritance parents. By eliminating repeated queries to determine both direct and inherited access control decisions, authorization overhead may be substantially reduced over the lifetime of a running server.

An authorization cache may include objects with direct access controls, AccessControlTemplates (ACTs), that can be referenced by objects or represent the Repository ACT, and the network of objects related by inheritance.

In-memory cache entries may be constructed incrementally and/or on-demand as the objects they represent are directly requested, or indirectly required due to inheritance. When a cache entry is constructed for an object protected by direct access control objects, a minimal set of association queries retrieve these objects into memory. The associations are then correlated and transformed into a dense format in the identity/permission table portion of each cache entry.

Also during construction of the cache entry, if any ACTs protect the object, these are first looked up in the ACT index for the cache. For each such ACT, if the ACT itself is already cached, the new object cache entry is simply set to reference it. If not, the ACT cache entry is created and a reference to it is then set in the cache entry for the protected object.

Access control decision requests drive the inheritance parent cache construction. New inheritance parents may be built on-demand when an access control decision cannot be determined from direct access controls on the requested object or any already-cached ancestor parents. Inheritance parent authorization cache entries necessary to determine the immediate access control decision are constructed. Memory consumption is minimized by not allocating an Identity/Permission table, and/or the ACT reference array, and/or Inheritance Parent reference array for authorization cache entries corresponding to objects for which this information does not apply.

Authorization caching may feature a granular locking strategy, allowing it to run safely in a multithreaded environment, where concurrent threads may be processing the same objects and their corresponding cache entries. A lock manger may keep a pool of locks that are serially reused by concurrent threads as various cache elements require locking. A lock may be obtained from the manager whenever a cache entry is to be locked for inspection or modification. This lock is keyed by the object's ID corresponding to the authorization cache entry. If the particular cache operation is modifying the entry, an exclusive lock is obtained; otherwise if the entry is simply being inspected, a shared lock is obtained. Operations on cache entries occur very quickly so locks are held for short durations and then released back to the pool for reuse.

The authorization cache may also include full synchronization with all related object additions, updates, or deletions that occur in the server. Synchronization may be implemented in two phases. Phase 1 monitors access control and inheritance parent related object changes per-thread during server execution. In phase 2, the captured changes from phase 1 are "surgically" committed once object-level changes for the thread are persisted to the underlying data store. This ensures that the cache will not be out-of-synch with direct authorizations or inheritance parents maintained in cache entries. Inheritance parent changes and/or object deletions are applied to the cache during synchronization. Changes in direct authorizations result in the cache entry being flagged for rebuild the next time the object it represents is referenced.

In one implementation, the cache entries that require change are those actually impacted by related object changes in the server. The remainder of the authorization cache may be left untouched and intact. During synchronization, the cache may already have grown to represent thousands, even millions of objects. Avoiding a rebuild of the entire cache for incremental authorization changes and/or inheritance parent network changes can substantially reduce authorization queries and computation time over the cache lifetime.

Figure 5:
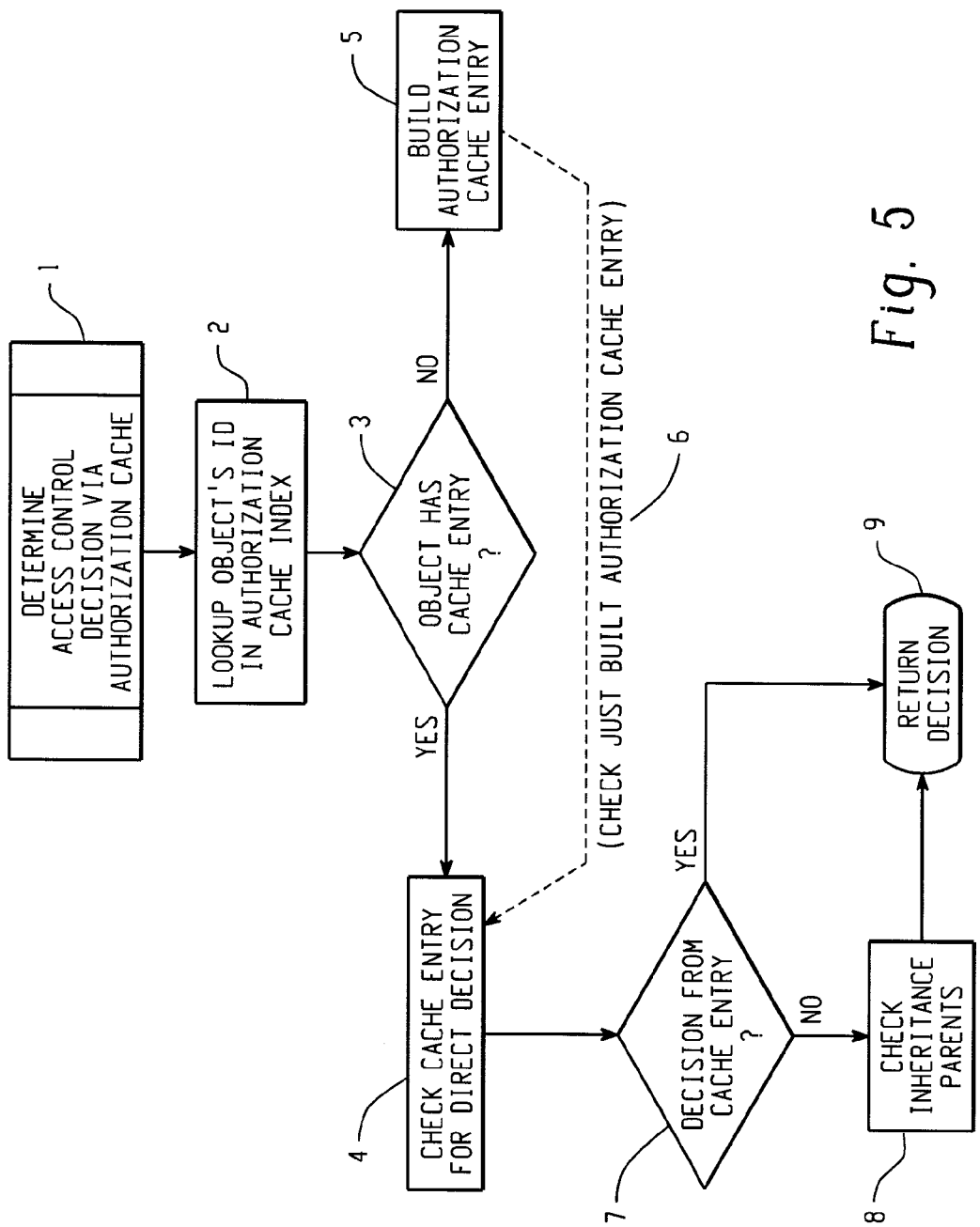
FIG. 5 depicts a flow diagram for determining an access control decision via an authorization cache.
Figure 6:
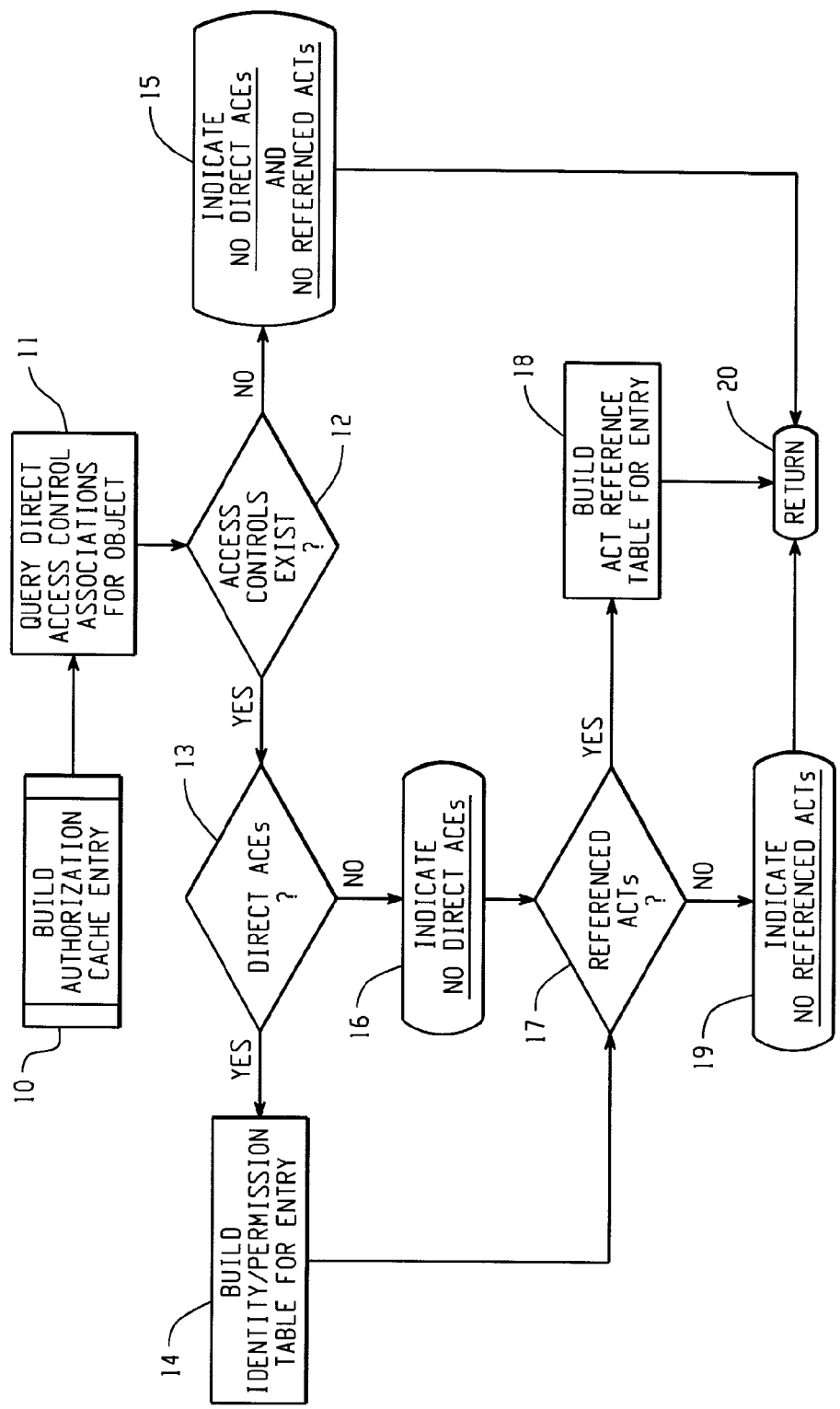
FIG. 6 depicts a flow diagram for building an authorization cache entry.

FIG. 5 depicts a flow diagram for determining an access control decision via an authorization cache. Upon receipt of a request to access a resource object by a requester, the process looks up the object's identifier in an authorization cache index at 2. If the object does not have an authorization cache entry, then an authorization cache entry is built for the entry, as shown at 5. A process for building an authorization cache entry is depicted in FIG. 6. Following a finding or creation of a cache entry corresponding to the requested resource object, the cache entry is checked for a direct decision as shown at 4 and 7 and described further in FIG. 7. For example, if an the Identity/Permission table for the cache entry grants or denies the type of requested access to the requested resource object by the requester, then the decision is returned at 9. As an additional example, if an access control template (ACT) corresponding to the requested resource object grants or denies the type of requested access to the requester, then the decision is returned at 9. However, if the cache entry corresponding to the requested resource object does not contain needed permission data to grant or deny access, then the inheritance parents are checked, as shown at 8 and described further in FIG. 8.

FIG. 6 depicts a flow diagram for building an authorization cache entry. A similar process may be used for rebuilding an authorization cache entry following a modification. If the process of FIG. 6 is being utilized for a new entry build, then the process may include an additional cache entry allocation step. At 11, a query is made to determine if the object has direct access control associations. If no direct access control associations are found, then an indication of such is returned at 15 along with an empty cache entry. If direct access control associations are located, then a determination is made at 13 as to whether direct ACEs for the object have been located. If a direct ACE is found, then the ACE-related associations are transformed into the identity/permission table for the cache entry being built, as shown at 14. If no ACEs are found, then such an indication is made at 16. A check for ACT references in the located access controls is made at 17. If an ACT reference is found, an ACT reference table is built for the cache entry at 18. If no ACT is located, then an indication of such is made at 19.

Figure 7:
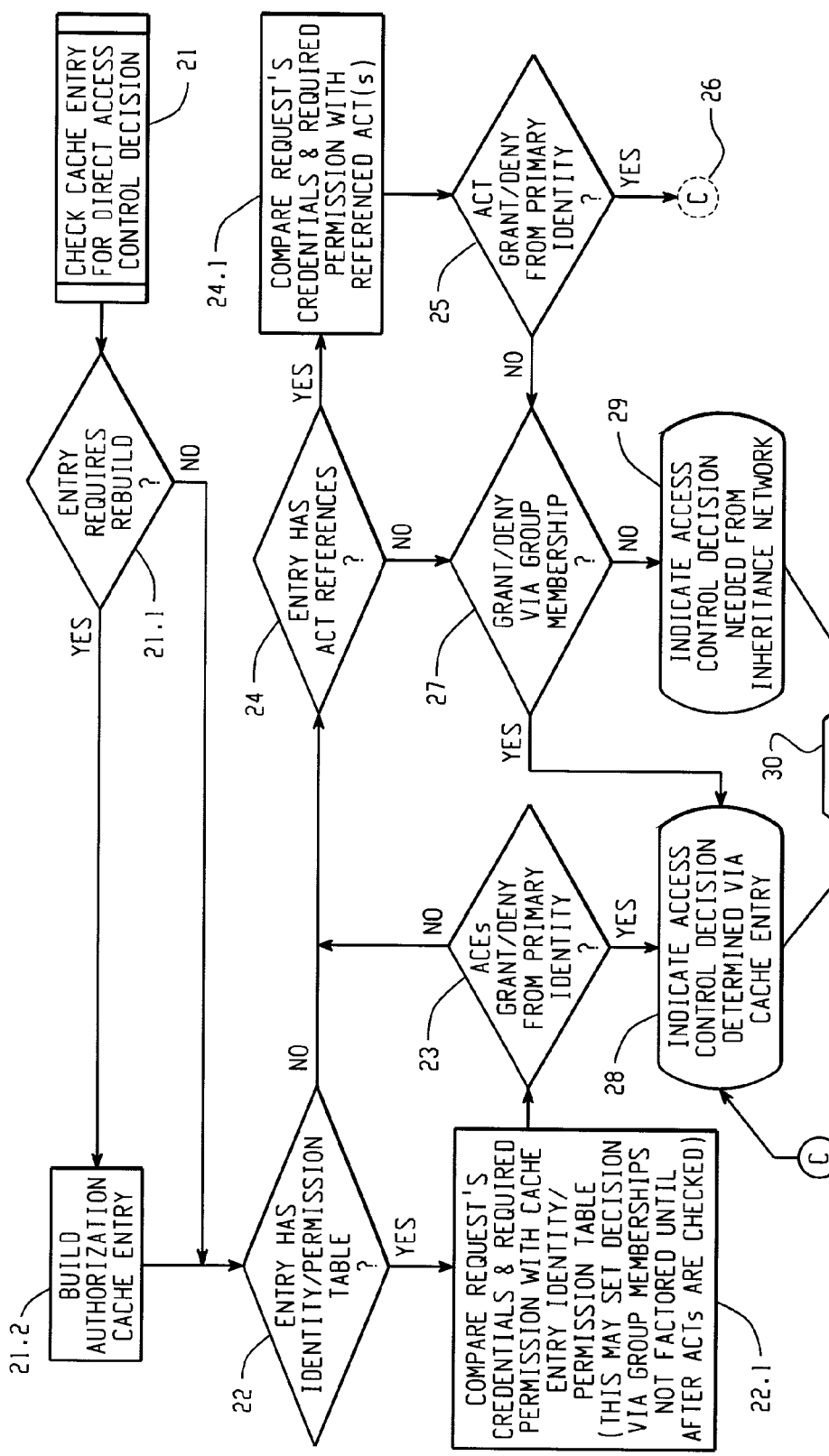
FIG. 7 depicts a flow diagram for checking an authorization cache entry for a direct decision.

FIG. 7 depicts a flow diagram for checking an authorization cache entry for a direct decision. At 21.1 an inquiry is made as to whether the entry corresponding to the requested resource object has been flagged for a rebuild. If the entry has been flagged, then the entry is rebuilt at 21.2, such as via the process depicted in FIG. 6. At 22 a determination is made as to whether the entry has an identity/permission table. If the entry does have an identity/permissions table, the table is checked for an access control decision. For example, each row may be keyed by an identity with a corresponding permissions array. The requester's credential may be iterated and compared to the table entries based on the requested permission and by a set of identity precedence rules.

An example set of identity precedence rules is depicted at 23-30. Note that in the following discussion the term ACE is used as shorthand to represent authorizations coming from the cache entry's identity/permission table. At 23, if the located ACEs (represented by the cache entry identity/permission table) provide a grant or deny decision based on the primary identity, then that decision is indicated and returned at 28, 30. If a grant|deny decision is not made on the primary identity in an ACE or if the entry does not have an identity/permission table, then a check for ACT references may be made at 24. If the authorization cache entry contains an ACT reference, then a check is made at 25 to determine if an ACT grant|deny decision may be made based on the primary identity. If such a decision can be made, then the decision is indicated and returned, as shown at 26, 28, 30. If an ACT grant|deny decision cannot be made from the primary identity, then a determination as to whether a grant|deny decision may be made from an ACE or ACT based on the group membership of the requester. An ACE decision based on group membership may take priority over an ACT decision depending on Identity precedence. Therefore, a decision coming from a group with the highest precedence may be returned no matter if the group comes from an ACE or ACT. However, if two groups with same precedence "tie" and one such group is from an ACE then the decision may come from the ACE (represented in the cache entry identity/permission table) because the ACE has greater authorization precedence in this case. If such a decision can be made, then it is indicated at 28 and returned at 30. Otherwise, an indication is made that an access control decision is to be made based on the inheritance network, as shown at 29. An example of such a process is depicted in FIG. 8.

Figure 8:
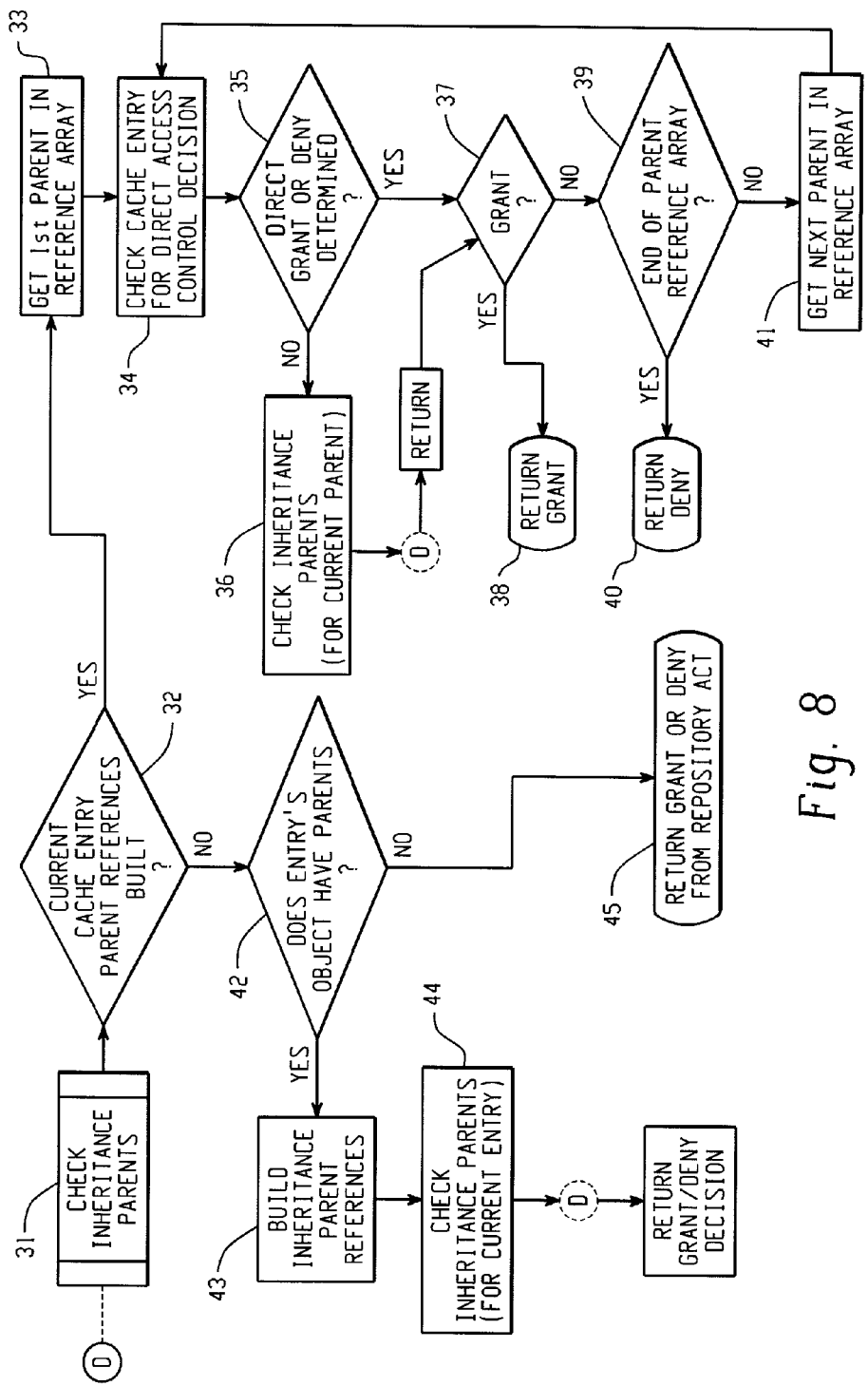
FIG. 8 depicts a flow diagram for checking inheritance parents for a grant|deny decision.
Figure 9:
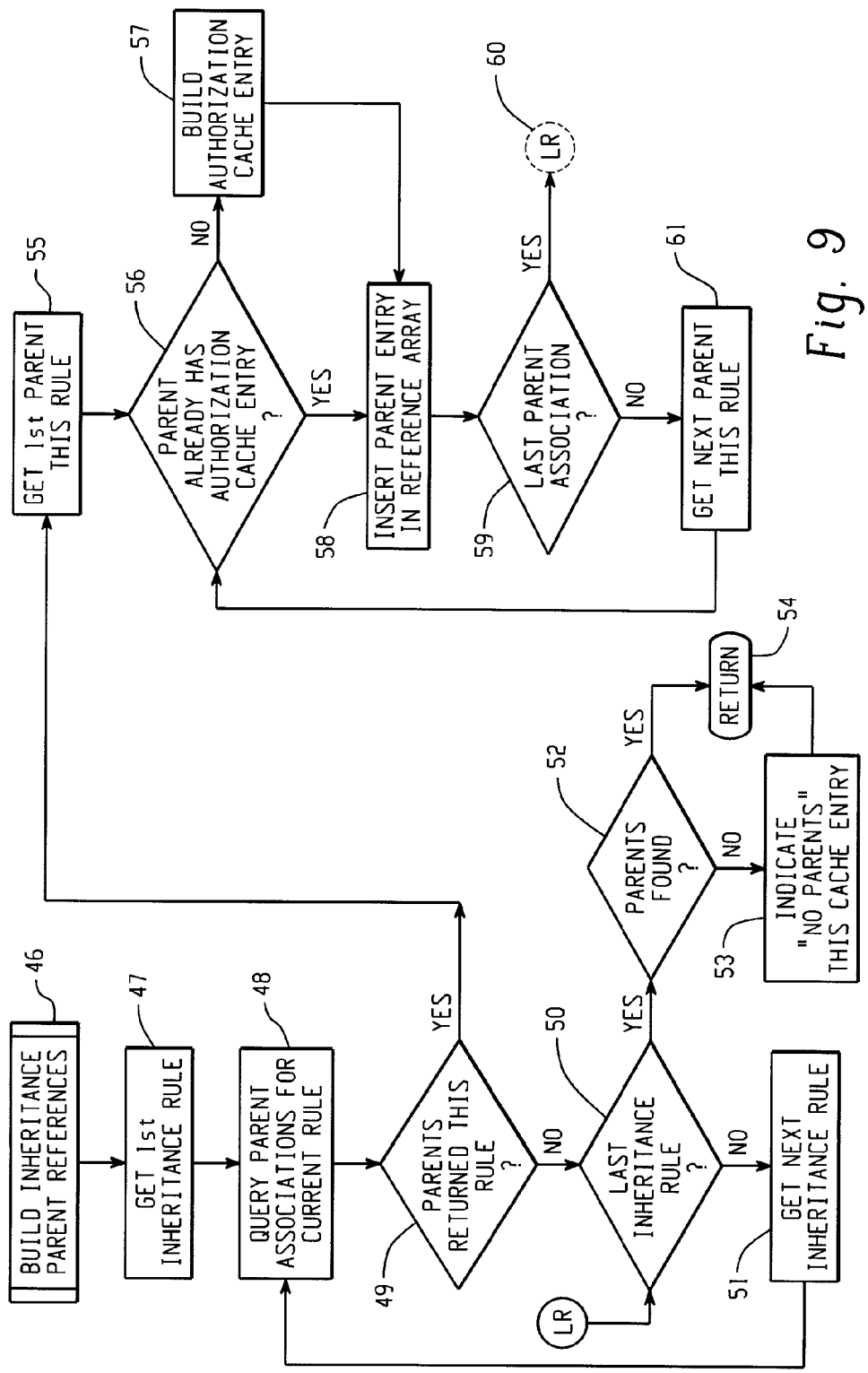
FIG. 9 depicts a flow diagram for building inheritance parent references.

FIG. 8 depicts a flow diagram for checking inheritance parents for a grant|deny decision. This process may include recursion at 36 or 44. At 32, a check is made to determine if cache entries for parents have been built. If a "No Parents" indicator is set then a grant|deny decision is returned from the flow diagram based on the repository's default ACT at 45. If cache entries have not been built for the parents, then a determination is made at 42 as to whether the object has parents. If no parents are found, then a grant|deny decision is returned from the flow diagram based on the repository's default ACT at 45. If parents do exist, then parent references are built at 43. An example of building inheritance parent references is depicted in FIG. 9. The process of FIG. 8 is then recursively called for the newly built parent reference array on the current cache entry, as shown at 44, with a return of a grant|deny decision.

If a current cache entry for the parent references has already been built at 32, then the first parent is fetched from the parent reference array at 33. The cache entry corresponding to the parent is checked for an authorization decision. For example, this checking may be executed in accordance with the process depicted in FIG. 7. If the parent entry provides a direct grant|deny decision, then the process continues at 37. If a direct decision cannot be made, then the process of FIG. 8 is recursively called to examine the parents of the parent currently being examined at 36 with a return of a result to block 37. This recursion may be repeated several levels until no parent objects are present. At this point, the repository ACT renders the grant or deny. If a grant decision is found at 37 from a parent or prior generation, then the grant decision is returned. If a grant decision is not found at 37, then the process of 34-40 is repeated for the next parent, as shown at 41. If no grant decision is found after a traversal of all ancestor objects, then a deny decision is returned at 40.

FIG. 9 depicts a flow diagram for building inheritance parent references. Parent references may be determined based on one or more inheritance rules. A first inheritance rule may be accessed at 47. Parent associations according to the accessed rule are then queried at 48.

If no parents are returned by the search, then the next rule is accessed at 51. Upon reaching a last rule, the generated parent reference array is returned or an indication of a failure to locate parents may be returned at 54. Upon a location of parents according to a rule, a first parent found in the query at 48 is extracted at 55. A determination is made at 56 as to whether the object corresponding to this parent already has an authorization cache entry. If an authorization cache entry does not exist, then an empty cache entry may be built at 57. This blank entry may be marked for a rebuild, such that data fields in the blank entry are filled on an as needed basis when the parent cache entry is accessed. The authorization cache entry may be built according to the process depicted in FIG. 6. The parent cache entry is inserted in the parent reference array for the target cache entry at 58. The process steps of 56, 57, and 58 may then be repeated for the remaining parents found by the query at 48 followed by a return to 50 to process the next inheritance rule.

Figure 10:
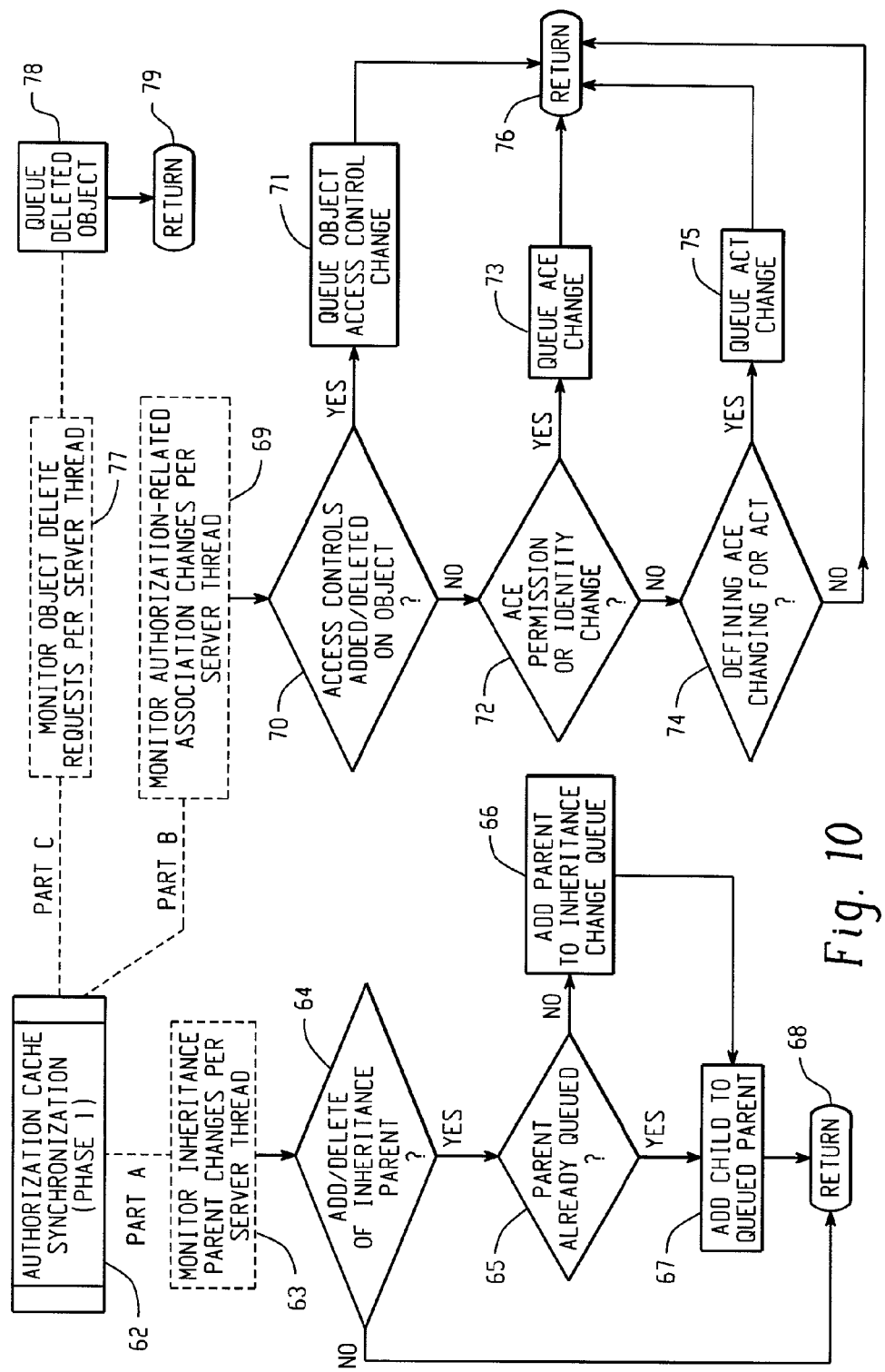
FIG. 10 depicts a flow diagram for a first phase of an authorization cache synchronization.

FIG. 10 depicts a flow diagram for a first phase of an authorization cache synchronization. Phase 1 of an authorization cache synchronization monitors object changes for each concurrent thread executing in the server. Any changes to access control or inheritance-related objects or associations are to be captured and queued for phase 2 of the synchronization process where they are committed to the authorization cache. This includes objects being deleted. The Phase 1 monitoring process may logically be divided into three distinct "Parts": labeled in FIG. 10 as Part A, Part B, and Part C.

Part A (steps 63-69 as shown in FIG. 10) monitors per-thread changes to the inheritance parent network. This may be logically separate from the other parts because the process for persisting or deleting an association object may cause authorization cache entries to be created and/or linked for an object and its inheritance parent. It may be the case that all datum to synchronize the inheritance parent cache may be captured after this occurs. Part A uses an inheritance parent change queue keyed on parent object Id. This queue contains an entry per captured parent change. Each parent entry has a list of one or more children (because an Inheritance parent may have multiple child references). In part A, a thread is monitored to identify when an inheritance parent is being added or deleted. Upon detection of an inheritance parent being added or deleted, an inquiry is made at 65 as to whether the parent has an entry in the thread specific inheritance change queue. If the parent does not have an entry, then a new parent entry is made in the thread specific inheritance change queue at 66. The child is added at 67 to the queued inheritance parent.

Part B (steps 69-76 as shown in FIG. 10) monitors access control changes that impact individual authorization cache entries. At 70, a determination is made as to whether access controls are added or deleted to an object that already has an authorization cache entry. If such an addition or deletion is discovered, then the access control change is queued in a thread specific association change queue for the cache entry. At 72, a determination is made as to whether an identity or permission change for an ACE corresponding to an object that has an authorization cache entry is made. Such a detected change is queued at 73. At 74, a determination is made as to whether an ACE for an ACT is changing. If so, the ACT change is queued at 75.

Part C (steps 77-79 as shown in FIG. 10) monitors per-thread object delete request. Any deleted object is queued at 78 and will later be examined in phase 2 of the synchronization process to determine if it requires that the authorization cache to be updated.

Phase 2 of authorization cache synchronization updates the authorization cache changes as the final stage in a thread's transaction commit, after all objects have been written to persistent storage. This occurs under an exclusive lock that protects the cache and all related resources. The work in phase 2 is divided into three parts as in phase 1.

Figure 11:
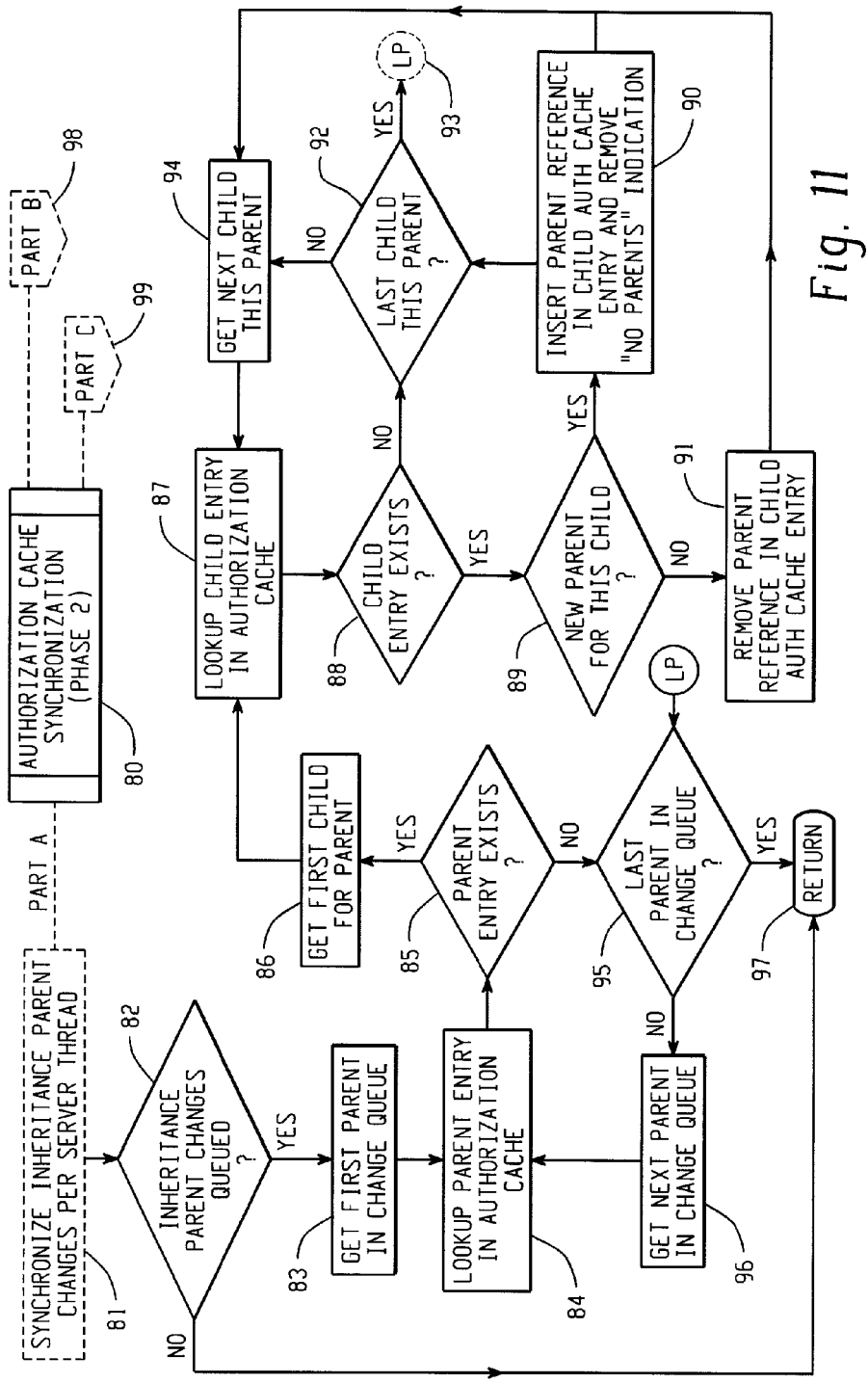
FIG. 11 depicts a flow diagram for part A of a second phase of an authorization cache synchronization.

FIG. 11 depicts a flow diagram for a part A of a second phase of an authorization cache synchronization. Part A synchronizes changes to the inheritance parent network. If inheritance parent changes are queued, the first parent change in the queue is fetched at 83. The parent entry is looked up in the authorization cache. If the entry does not exist at 85, then the next parent change in the queue is examined at 95. If the entry does exist, then the first child for the parent is located at 86 from the parent's child list. The child entry is looked up at 87. If the child entry does not exist, then the next child is fetched at 94. If the child entry does exist, then a determination is made at 89 as to whether the queued operation is assigning a new parent to the child. If so, then the parent reference is inserted into the child's parent reference array along with any "No Parents" indications at 90. If the change is instead a delete operation, then the parent is removed from the child's parent reference array at 91. The process 87-93 may be repeated for each child of the parent, as shown at 94. Upon processing of each child of the parent, the process may return to process the next queued change, as shown at 93.

Figure 12:
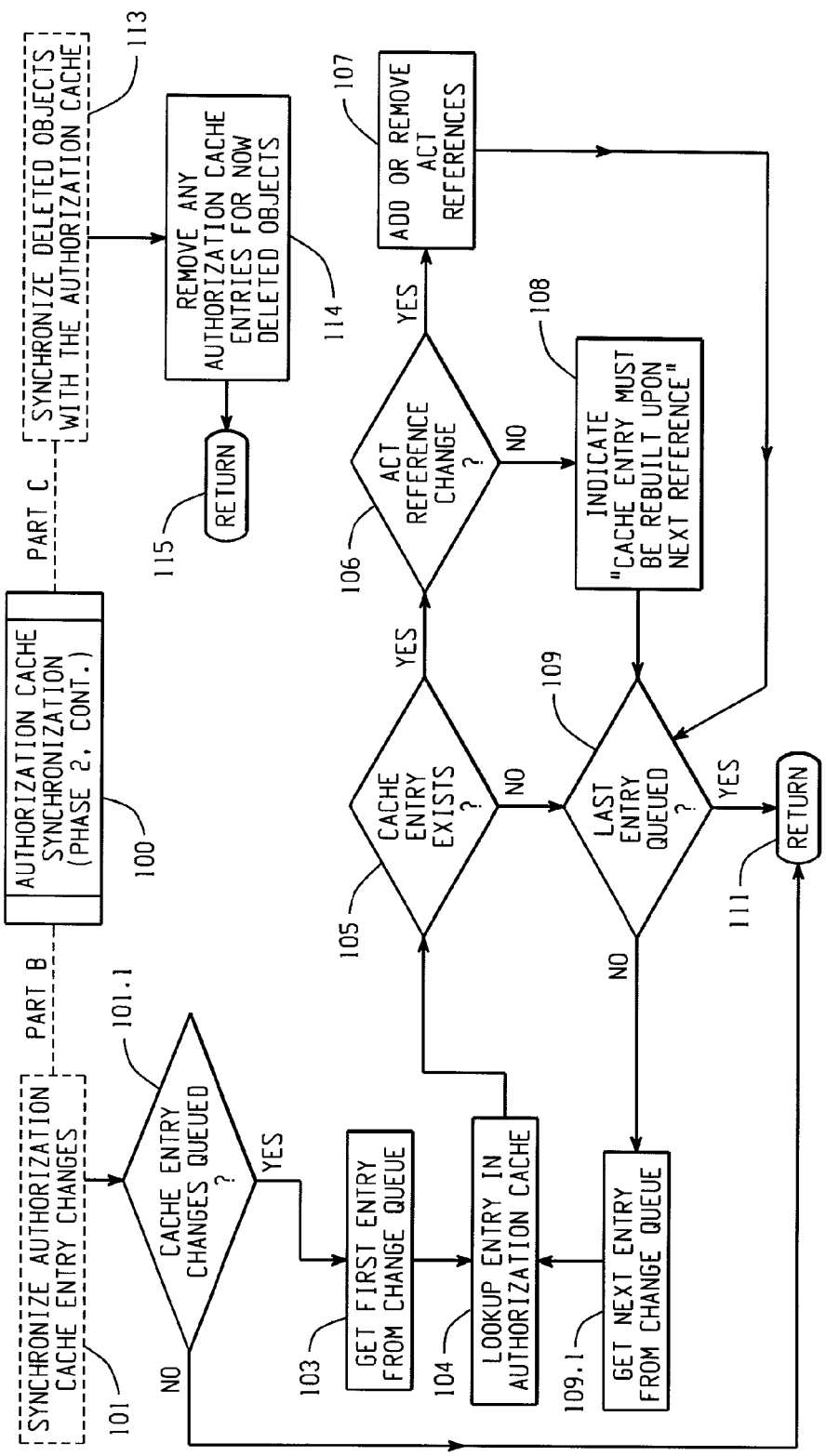
FIG. 12 depicts a flow diagram for parts B and C of a second phase of an authorization cache synchronization.

FIG. 12 depicts a flow diagram for parts B and C of a second phase of an authorization cache synchronization. Part B 101-111 synchronizes direct changes to authorization cache entries. If cache entry changes are queued in a thread specific association change queue, the first entry in the queue is fetched at 103, and the entry corresponding to the change is looked up in the authorization cache at 104. If the entry is not found, the next change in the queue is fetched at 109.1. If the associated entry is located, then a determination is made as to whether the change indicated by the queue record is an ACT reference change at 106. An ACT change may affect records stored in a location other than the authorization cache such as in memory or another cache. If the change is an ACT change, then ACT reference(s) are added or removed per the queue record requirements at 107. If the change is not an ACT reference change, then an indication is made at 108 that the cache entry is to be rebuilt the next time the entry is referenced. This cache entry rebuild indication may be applied to both protected objects, where the access controls have changed, as well as to changes to the access controls that define an ACT, which may be in a separate cache. The remainder of changes listed in the queue is then similarly processed as indicated at 109.

FIG. 12 also includes a depiction of part C of the second phase of an authorization cache synchronization 113-115. Part C synchronizes deleted objects with the authorization cache. This process is accomplished at 114 where any cache entries corresponding to objects that have been noted for removal from the authorization cache are removed from the authorization cache.

FIGS. 13-16 depict an example illustrating several server events where authorization cache entries are built along with related ACT references, identity/permission tables, and/or inheritance parent references. The example also demonstrates the construction of the authorization cache as a natural consequence of access control decisions required for object requests. For simplicity, each diagram does not re-depict all entries that have not changed from a prior step.

Figure 13:
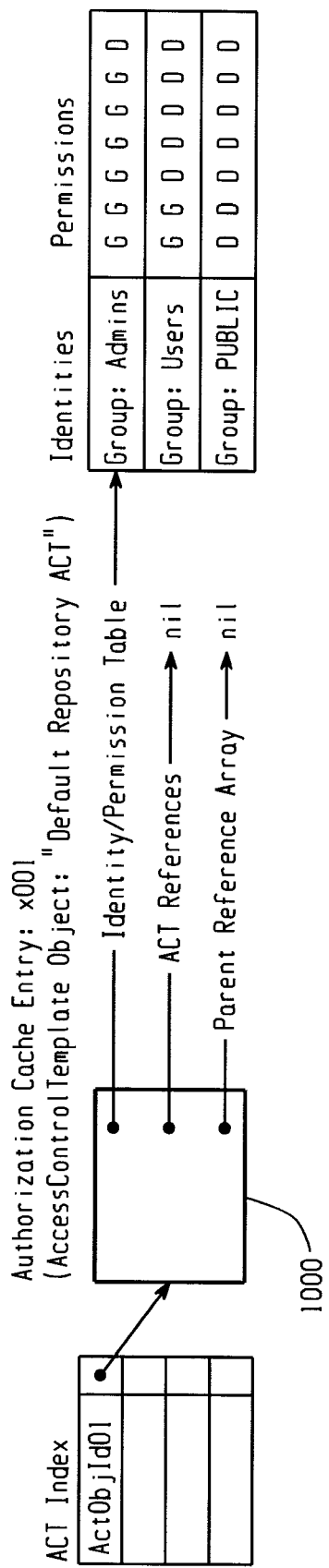
FIGS. 13-16 depict an example illustrating several server events where authorization cache entries are built along with related ACT references, Identity/Permission tables, and/or inheritance parent references.

FIG. 13 depicts an ACT index at initialization. At initialization, the cache entry for the default repository ACT is built and its object ID 1000 is inserted into the ACT index. The default repository ACT provides the access control decision when neither the requested object nor any of its inheritance parents do. As illustrated in FIG. 13, an ACT entry may contain a pointer to an access control permission table, a pointer to other ACT references (a nil pointer in this figure), and a pointer to a parent reference array.

Figure 14:
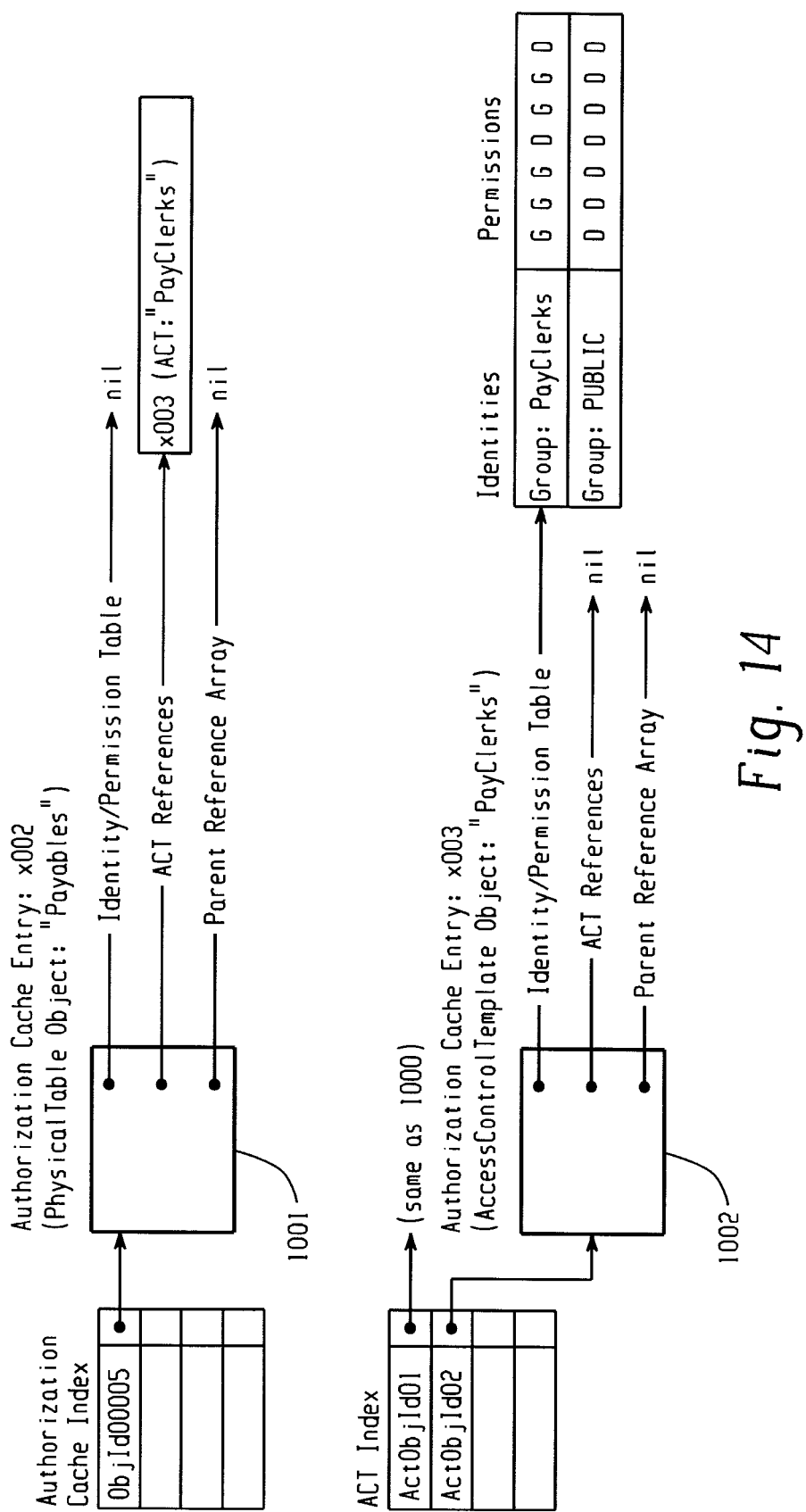

FIG. 14 depicts the authorization cache upon a request to the server for a physical table object, "Payables." An access control entry 1001 is built and checked for the "Payables" object in the authorization cache index. This may be accomplished, for example, by steps 2-6 of FIG. 5. Because the "Payables" object cache entry includes a reference to the "PayClerks" ACT, an authorization cache entry is added to the ACT index that corresponds with the ACT. This may be accomplished, for example, by steps 11-18, shown in FIG. 6. Both entries contain pointers to an identity/permission table, an ACT reference, and a parent reference array. The PayClerks'identity/permission table pointer is not null and identifies several grant|deny (i.e., grant or deny) permissions for different group identities.

Figure 15:
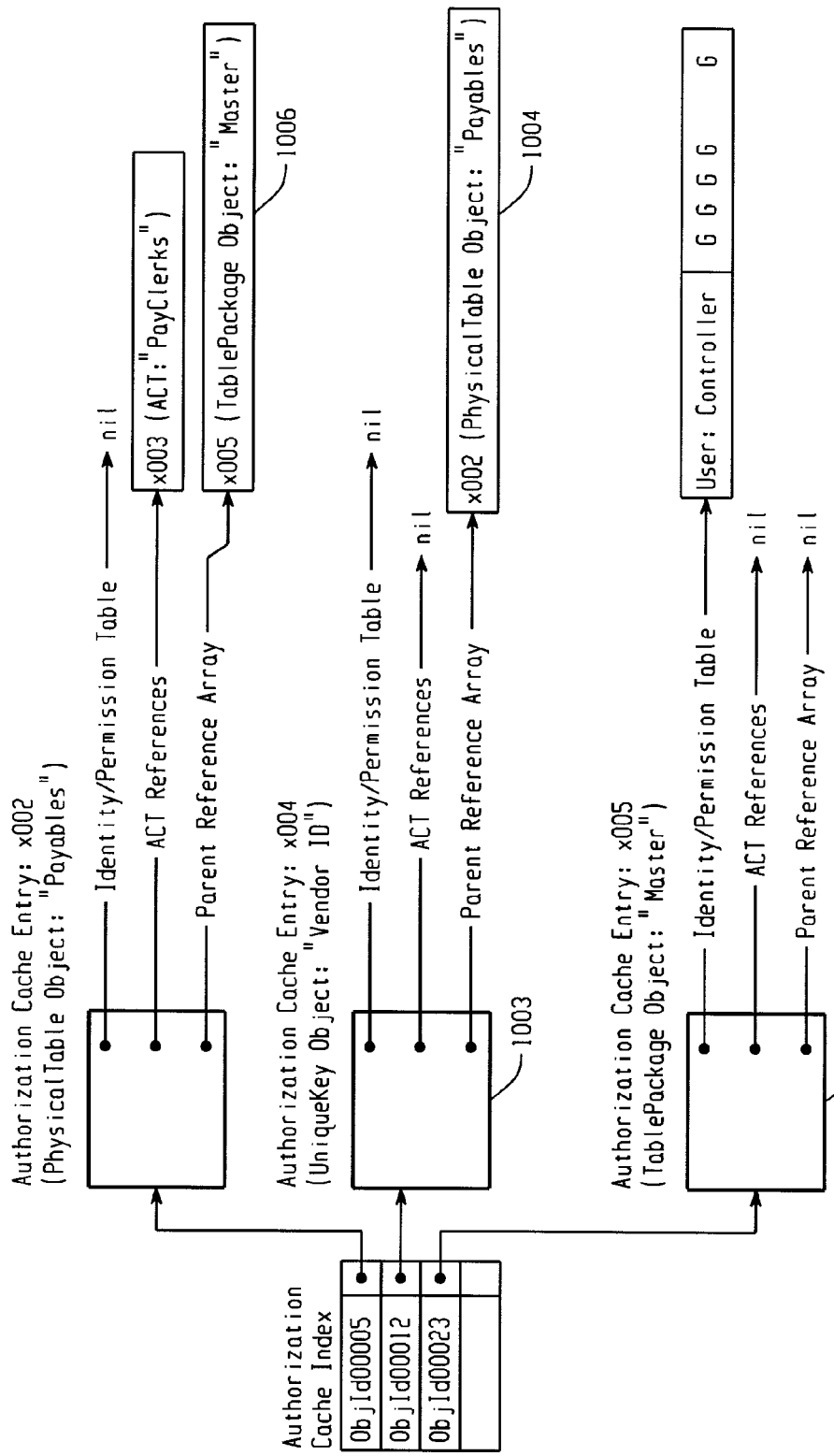

FIG. 15 depicts the authorization cache upon a request to the server for the unique key object, "Vendor ID." An authorization cache entry is built and checked for "Vendor ID" 1003. This may be accomplished, for example, by steps 2-6 of FIG. 5. The unique key object "Vendor ID" has no direct access controls, so the process next checks the Vendor ID's direct inheritance parent, the physical table object, "Payables," which is inserted as the first element of the Vendor ID parent reference array. This may be accomplished, for example, as shown at item 8 of FIG. 5 and the steps of FIGS. 9 and 10. However, the parent cache entry for payables also does not provide the access control decision, so the Payables object's inheritance parents are checked. Upon determining that the "Master" table package object is the first parent to the Payables object, a cache entry is built for the table package object, Master 1005, and set as the first element in the parent reference array for the physical table object, Payables, as shown at 1006. This may be accomplished, for example, by step 43 of FIG. 9 and steps 56-58 of FIG. 10.

Figure 16:
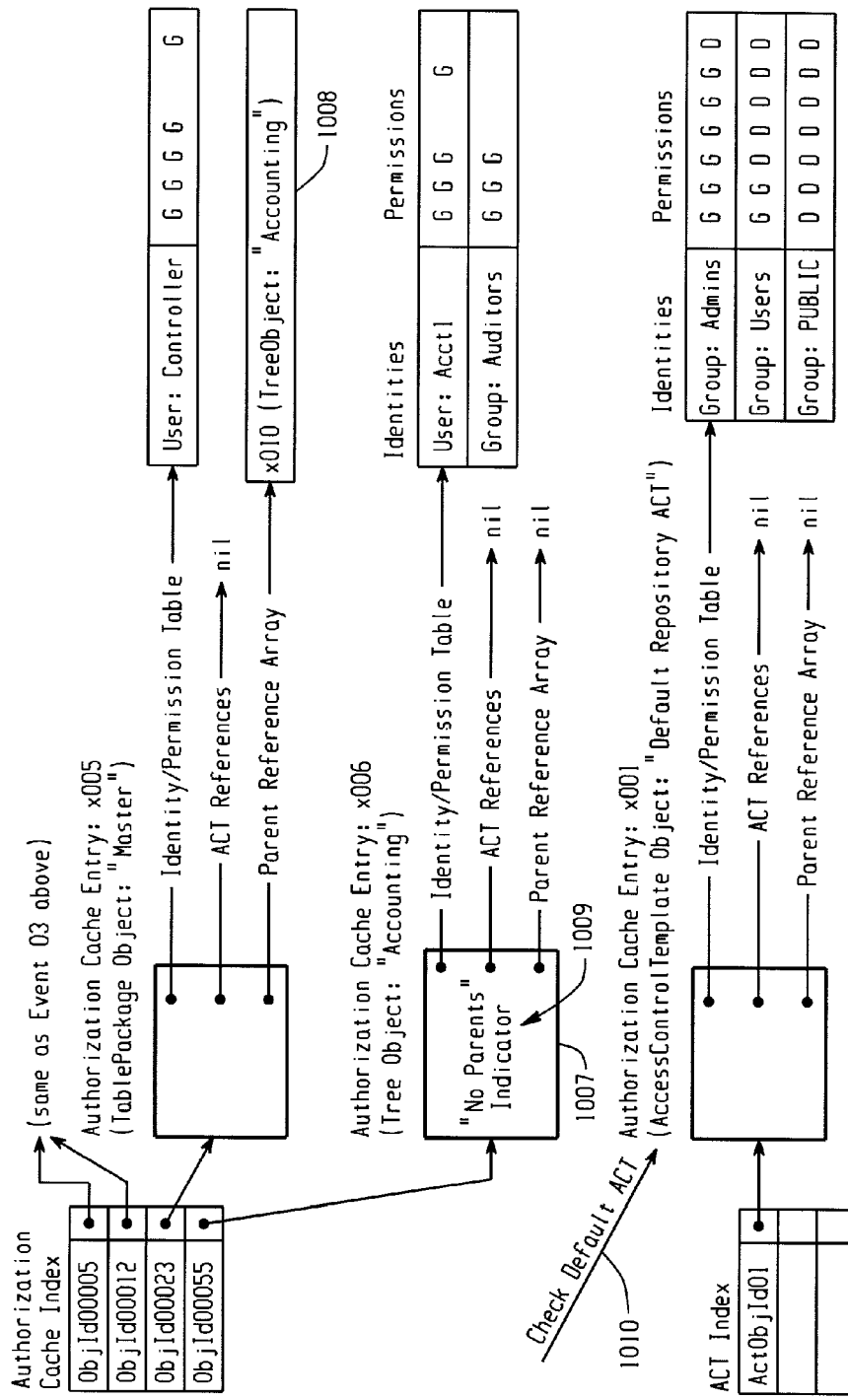

FIG. 16 depicts the authorization cache upon a request to the server for the table package object, "Master." The Master object already has an authorization cache entry with an identity permission table. However, the identity/permission table of the Master cache entry does not contain sufficient permission data for the operation requested. This is illustrated by the Master authorization cache entry missing certain values in its identity/permission table. Thus, the Master objects inheritance parents are checked. The inheritance rules identify the "Accounting" tree object as the parent of the Master object. A cache entry 1007 for the tree object, Accounting, is built and set as the first element in the parent reference array for the Master object, as shown at 1008. The identity/permission table for the Accounting object cache entry is checked. However, it is also unable to determine the access control decision. Inheritance processing may continue with a query to determine if the Accounting object has any parents. Because it has none, the cache entry is marked with a "No Parents" indicator as shown at 1009. Because the Accounting cache entry cannot provide the decision and has no parents, the decision is made based on the default repository ACT, depicted at 1010.

This written description uses examples to disclose the invention, including the best mode, and also to enable a person skilled in the art to make and use the invention. The patentable scope of the invention may include other examples. For example, the systems and methods may include data signals conveyed via networks (e.g., local area network, wide area network, internet, combinations thereof, etc.), fiber optic medium, carrier waves, wireless networks, etc. for communication with one or more data processing devices. The data signals can carry any or all of the data disclosed herein that is provided to or from a device.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The systems and methods may be provided on many different types of computer-readable media including computer storage mechanisms (e.g., CD-ROM, diskette, RAM, flash memory, computer's hard drive, etc.) that contain instructions (e.g., software) for use in execution by a processor to perform the methods' operations and implement the systems described herein.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive or" may be used to indicate situation where only the disjunctive meaning may apply.

It is claimed:

1. A computer-implemented method, comprising:
accessing a resource object having an identifier, wherein the resource object has multiple associations with other objects;
receiving a first request to provide a first requesting entity with a first indicated type of access to the resource object;
searching an authorization cache index using the identifier, wherein searching includes determining whether an authorization cache entry for the resource object exists;
generating, on a computing device, a new authorization cache entry for the resource object, wherein generating a new authorization cache entry includes:
identifying objects related to the resource object through direct access control associations, wherein a direct access control association has a corresponding access control entry object; and
generating a table, wherein the table includes an identity and access permission status for each of one or more associated objects, and wherein the new authorization cache entry includes the generated table;
determining whether the new authorization cache entry grants or denies the first indicated type of access to the first requesting entity;
providing the first indicated type of access to the first requesting entity based on determining that the new authorization cache entry grants the first indicated type of access to the first requesting entity;
subsequent to providing the first indicated type of access, receiving a second request to provide a second requesting entity with a second indicated type of access to the resource object;
determining that the new authorization cache entry neither grants nor denies the second indicated type of access to the second requesting entity; and
in response to determining that the new authorization cache entry neither grants nor denies the second indicated type of access, accessing a cache entry for a parent object of the resource object.

2. The method of claim 1, further comprising:
ascertaining an indicated access decision, wherein the access decision affects access to the resource object, is indicated by the cache entry for the parent object, and indicates whether permission for the second indicated type of access to the resource object is granted to the second requesting entity.

3. The method of claim 2, further comprising:
determining whether to provide the second indicated type of access, wherein determining is based on the ascertained access decision; and
providing or withholding the second indicated type of access in accordance with the determination.

4. The method of claim 1, further comprising:
receiving a third request to provide access to the resource object;
identifying inherited permission data from an object associated with the resource object;
building an authorization cache entry corresponding to the object associated with the resource object; and
determining whether to grant or deny the third request, wherein determining whether to grant or deny the third request is based on the inherited permission data.

5. The method of claim 4, wherein identifying inherited permission data from an object associated with the resource object includes identifying inherited permission data from multiple objects associated with the resource object through a direct parent association.

6. The method of claim 1, wherein generating a new authorization cache entry further includes:
allocating an authorization cache entry data structure and adding the identifier to the authorization cache index.

7. The method of claim 6, wherein generating a new authorization cache entry further includes:
   querying direct access control associations of the resource object, wherein querying includes identifying access control entries and access control templates associated with the resource object.

8. The method of claim 7, wherein generating a new authorization cache entry further includes:
   forming an identity and permission table which corresponds to the authorization cache, wherein forming the identity and permission table includes using values for identity and permission associations; and
   identifying access control templates which are not yet cached.

9. The method of claim 8, wherein generating a new authorization cache entry further includes:
   for each of the identified access control templates which is not yet cached, generating an access control template cache entry and a reference to the access control template cache entry; and
   adding each of the access control template cache entry references to an access control template reference array, and wherein the new authorization cache entry includes:
   the access control template reference array;
   a pointer to the identity and permission table;
   a pointer to the access control template reference array; and
   a pointer to a parent reference array.

10. The method of claim 1, further comprising:
    building a parent reference array corresponding to the resource object, wherein the parent reference array identifies parent objects of the resource object; and
    searching the parent reference array corresponding to the resource object, wherein searching the parent reference array includes:
       searching an identity/permission table or an access control template associated with a parent in the parent reference array, wherein searching includes identifying permission data.

11. The method of claim 10, wherein building the parent reference array includes:
    accessing a first inheritance rule associated with the first requesting entity;
    identifying parent objects of the resource object, wherein identifying includes using the first inheritance rule;
    for each identified parent object, determining whether the identified parent object has an existing cache entry in the authorization cache index; and
    for each identified parent object determined to not have an existing cache entry, building an authorization cache entry in the authorization cache index.

12. The method of claim 1, further comprising:
    changing a direct authorization included in the new authorization cache entry; and
    in response to changing the direct authorization, flagging the new authorization cache entry for rebuild.

13. The method of claim 12, further comprising:
    ascertaining whether the new authorization cache entry indicates a rebuilding flag.

14. The method of claim 1, wherein determining that the new authorization cache entry grants the first indicated type of access includes checking the generated table for an indication that the first indicated type of access is granted.

15. The method of claim 1, wherein determining that the new authorization cache entry neither grants nor denies the second indicated type of access to the second requesting entity includes iteratively comparing a credential to entries in the generated table.

16. The method of claim 15, wherein the credential is a credential of the second requesting entity.

17. The method of claim 16, wherein iteratively comparing a credential to entries in the generated table is done in accordance with a set of identity precedence rules.

18. The method of claim 1, wherein generating a new authorization cache entry further includes creating an AccessControlTemplate (ACT) cache entry.

19. The method of claim 1, further comprising:
    constructing the cache entry for the parent object of the resource object.

20. The method of claim 1, further comprising:
    locking the new authorization cache entry and modifying the new authorization cache entry while the new authorization cache entry is locked.

21. The method of claim 20, wherein locking the new authorization cache entry is done using a lock configured to be keyed by the identifier of the resource object.

22. The method of claim 1, wherein the new authorization cache entry and the cache entry for the parent object are held in the authorization cache.

23. The method of claim 22, further comprising:
    updating the cache entry for the parent object; and
    synchronizing the authorization cache by modifying only cache entries to which the parent object is related.

24. A computer-program product tangibly embodied in a non-transitory machine readable storage medium, and including instructions configured to cause a data processing apparatus to perform operations including:
    accessing a resource object having an identifier, wherein the resource object has multiple associations with other objects;
    receiving a first request to provide a first requesting entity with a first indicated type of access to the resource object;
    searching an authorization cache index using the identifier, wherein searching includes determining whether an authorization cache entry for the resource object exists;
    generating a new authorization cache entry for the resource object, wherein generating a new authorization cache entry includes:
       identifying objects related to the resource object through direct access control associations, wherein a direct access control association has a corresponding access control entry object; and
       generating a table, wherein the table includes an identity and access permission status for each of one or more associated objects, and
    wherein the new authorization cache entry includes the generated table;
    determining whether the new authorization cache entry grants or denies the first indicated type of access to the first requesting entity;
    providing the first indicated type of access to the first requesting entity based on determining that the new authorization cache entry grants the first indicated type of access to the first requesting entity;
    subsequent to providing the first indicated type of access, receiving a second request to provide a second requesting entity with a second indicated type of access to the resource object;
    determining that the new authorization cache entry neither grants nor denies the second indicated type of access to the second requesting entity; and in response to determining that the new authorization cache entry neither grants nor denies the second indicated type of access, accessing a cache entry for a parent object of the resource object.

25. The computer-program product of claim 24, wherein the operations further comprise:
ascertaining an access decision, wherein the access decision affects access to the resource object, is indicated by the cache entry for the parent object, and indicates whether permission for the second indicated type of access to the resource object is granted to the second requesting entity.

26. The computer-program product of claim 25, wherein the operations further comprise:
determining whether to provide the second indicated type of access, wherein determining is based on the ascertained access decision; and
providing or withholding the second indicated type of access based on the determination.

27. The computer-program product of claim 24, wherein the operations further comprise:
receiving a third request to provide access to the resource object;
identifying inherited permission data from an object associated with the resource object;
building an authorization cache entry corresponding to the object associated with the resource object; and
determining whether to grant or deny the third request, wherein determining whether to grant or deny the third request is based on the inherited permission data.

28. The computer-program product of claim 27, wherein identifying inherited permission data from an object associated with the resource object includes identifying inherited permission data from multiple objects associated with the resource object through a direct parent association.

29. The computer-program product of claim 24, wherein generating a new authorization cache entry further includes allocating an authorization cache entry data structure and adding the identifier to the authorization cache index.

30. The computer-program product of claim 29, wherein generating a new authorization cache entry further includes:
querying direct access control associations of the resource object, wherein querying includes identifying access control entries and access control templates associated with the resource object.

31. The computer-program product of claim 30, wherein generating a new authorization cache entry further includes:
forming an identity and permission table which corresponds to the authorization cache, wherein forming the identity and permission table includes using values for identity and permission associations; and
identifying access control templates which are not yet cached.

32. The computer-program product of claim 31, wherein generating a new authorization cache entry further includes:
for each of the identified access control templates which is not yet cached, generating an access control template cache entry and a reference to the access control template cache entry; and
adding each of the access control template cache entry references to an access control template reference array, wherein the new authorization cache entry includes:
the access control template reference array;
a pointer to the identity and permission table;
a pointer to the access control template reference array; and
a pointer to a parent reference array.

33. The computer-program product of claim 24, wherein the operations further comprise:
building a parent reference array corresponding to the resource object, wherein the parent reference array identifies parent objects of the resource object; and
searching the parent reference array corresponding to the resource object, wherein searching the parent reference array includes:
searching an identity/permission table or an access control template associated with a parent in the parent reference array, wherein searching includes identifying permission data.

34. The computer-program product of claim 33, wherein building the parent reference array further includes:
accessing a first inheritance rule associated with the first requesting entity;
identifying parent objects of the resource object, wherein identifying includes using the first inheritance rule;
for each identified parent object, determining whether the identified parent object has an existing cache entry in the authorization cache index; and
for each identified parent object determined to not have an existing cache entry, building an authorization cache entry in the authorization cache index.

35. The computer-program product of claim 24, wherein the operations further comprise:
changing a direct authorization included in the authorization cache entry; and
in response to changing the direct authorization, flagging the authorization cache entry for rebuild.

36. The computer-program product of claim 35, wherein the operations further comprise:
ascertaining whether the new authorization cache entry indicates a rebuilding flag.

37. The computer-program product of claim 24, wherein determining that the new authorization cache entry grants the first indicated type of access includes checking the generated table for an indication that the first indicated type of access is granted.

38. The computer-program product of claim 24, wherein determining that the new authorization cache entry neither grants nor denies the second indicated type of access to the second requesting entity includes iteratively comparing a credential to entries in the generated table.

39. The computer-program product of claim 38, wherein the credential is a credential of the second requesting entity.

40. The computer-program product of claim 39, wherein iteratively comparing a credential to entries in the generated table is done in accordance with a set of identity precedence rules.

41. The computer-program product of claim 24, wherein generating a new authorization cache entry includes creating an AccessControlTemplate (ACT) cache entry.

42. The computer-program product of claim 24, wherein the operations further comprise:
constructing the cache entry for the parent object of the resource object.

43. The computer-program product of claim 24, wherein the operations further comprise:
locking the new authorization cache entry and modifying the new authorization cache entry while the new authorization cache entry is locked.

44. The computer-program product of claim 43, wherein locking the new authorization cache entry is done using a lock configured to be keyed by the identifier of the resource object.

45. The computer-program product of claim 24, wherein the new authorization cache entry and the cache entry for the parent object are held in the authorization cache.

46. The computer-program product of claim 45, wherein the operations further comprise:
  updating the cache entry for the parent object; and
  synchronizing the authorization cache by modifying only cache entries to which the parent object is related.

47. A system, comprising:
  one or more data processors; and
  one or more non transitory computer-readable storage media containing instructions configured to cause the one or more processors to perform operations including:
  accessing a resource object having an identifier, wherein the resource object has multiple associations with other objects;
  receiving a first request to provide a first requesting entity with a first indicated type of access to the resource object;
  searching an authorization cache index using the identifier, wherein searching includes determining whether an authorization cache entry for the resource object exists;
  generating a new authorization cache entry for the resource object, wherein generating a new authorization cache entry includes:
    identifying objects related to the resource object through direct access control associations, wherein a direct access control association has a corresponding access control entry object; and
    generating a table, wherein the table includes an identity and access permission status for each of one or more associated objects, and
  wherein the new authorization cache entry includes the generated table;
  determining whether the new authorization cache entry grants or denies the first indicated type of access to the first requesting entity;
  providing the first indicated type of access to the first requesting entity based on determining that the new authorization cache entry grants the first indicated type of access to the first requesting entity;
  subsequent to providing the first indicated type of access, receiving a second request to provide a second requesting entity with a second indicated type of access to the resource object;
  determining that the new authorization cache entry neither grants nor denies the second indicated type of access to the second requesting entity; and
  in response to determining that the cache entry neither grants nor denies the second indicated type of access, accessing a cache entry for a parent object of the resource object.

48. The system of claim 47, wherein the operations further comprise:
  ascertaining an access decision, wherein the access decision affects access to the resource object, is indicated by the cache entry for the parent object, and indicates whether permission for the second indicated type of access to the resource object is granted to the second requesting entity.

49. The system of claim 48, wherein the operations further comprise:
  determining whether to provide the second indicated type of access, wherein determining is based on the ascertained access decision; and
  providing or withholding the second indicated type of access in accordance with the determination.

50. The system of claim 47, wherein the operations further comprise:
  receiving a third request to provide access to the resource object;
  identifying inherited permission data from an object associated with the resource object;
  building an authorization cache entry corresponding to the object associated with the resource object; and
  determining whether to grant or deny the third request, wherein determining whether to grant or deny the third request is based on the inherited permission data.

51. The system of claim 50, wherein identifying inherited permission data from an object associated with the resource object includes identifying inherited permission data from multiple objects associated with the resource object through a direct parent association.

52. The system of claim 47, wherein generating a new authorization cache entry further includes allocating an authorization cache entry data structure and adding the identifier to the authorization cache index.

53. The system of claim 52, wherein generating a new authorization cache entry further includes:
  querying direct access control associations of the resource object, wherein querying includes identifying access control entries and access control templates associated with the resource object.

54. The system of claim 53, wherein generating a new authorization cache entry further includes:
  forming an identity and permission table which corresponds to the authorization cache, wherein forming the identity and permission table includes using values for identity and permission associations; and
  identifying access control templates which are not yet cached.

55. The system of claim 54, wherein generating a new authorization cache entry further includes:
  for each of the identified access control templates which is not yet cached, generating an access control template cache entry and a reference to the access control template cache entry; and
  adding each of the access control template cache entry references to an access control template reference array, wherein the new authorization cache entry includes:
    the access control template reference array;
    a pointer to the identity and permission table;
    a pointer to the access control template reference array; and
    a pointer to a parent reference array.

56. The system of claim 47, wherein the operations further comprise:
  building a parent reference array corresponding to the resource object, wherein the parent reference array identifies parent objects of the resource object; and
  searching the parent reference array corresponding to the resource object, wherein searching the parent reference array includes:
    searching an identity/permission table or an access control template associated with a parent in the parent reference array, wherein searching includes identifying permission data.

57. The system of claim 56, wherein building the parent reference array further includes:
  accessing a first inheritance rule associated with the first requesting entity;
  identifying parent objects of the resource object, wherein identifying includes using the first inheritance rule;

for each identified parent object, determining whether the identified parent object has an existing cache entry in the authorization cache index; and for each identified parent object determined to not have an existing cache entry, building an authorization cache entry in the authorization cache index.

58. The system of claim 47, wherein the operations further comprise:

changing a direct authorization included in the authorization cache entry; and in response to changing the direct authorization, flagging the authorization cache entry for rebuild.

59. The system of claim 58, wherein the operations further comprise:

ascertaining whether the new authorization cache entry indicates a rebuilding flag.

60. The system of claim 47, wherein determining that the new authorization cache entry grants the first indicated type of access includes checking the generated table for an indication that the first indicated type of access is granted.

61. The system of claim 47, wherein determining that the new authorization cache entry neither grants nor denies the second indicated type of access to the second requesting entity includes iteratively comparing a credential to entries in the generated table.

62. The system of claim 61, wherein the credential is a credential of the second requesting entity.

63. The system of claim 62, wherein iteratively comparing a credential to entries in the generated table is done in accordance with a set of identity precedence rules.

64. The system of claim 47, wherein generating a new authorization cache entry includes creating an AccessControlTemplate (ACT) cache entry.

65. The system of claim 47, wherein the operations further comprise:

constructing the cache entry for the parent object of the resource object.

66. The system of claim 47, wherein the operations further comprise:

locking the new authorization cache entry and modifying the new authorization cache entry while the new authorization cache entry is locked.

67. The system of claim 66, wherein locking the new authorization cache entry is done using a lock configured to be keyed by the identifier of the resource object.

68. The system of claim 47, wherein the new authorization cache entry and the cache entry for the parent object are held in the authorization cache.

69. The system of claim 68, wherein the operations further comprise:

updating the cache entry for the parent object; and synchronizing the authorization cache by modifying only cache entries to which the parent object is related.

* * * * *